United States Patent [19]

Crawford

[11] 4,192,543
[45] Mar. 11, 1980

[54] HORIZONTAL AUXILIARY SLEEPER DOOR

[76] Inventor: James F. X. Crawford, 533 62nd St., Brooklyn, N.Y. 11220

[21] Appl. No.: 938,881

[22] Filed: Sep. 1, 1978

[51] Int. Cl.² .............................................. B60P 3/34
[52] U.S. Cl. ..................................... 296/159; 296/146; 135/1 A
[58] Field of Search ............... 296/156, 159, 160, 163, 296/169, 57 R, 57 A, 146; 135/1 A, 5 A, 4 A, 3 A

[56] References Cited

U.S. PATENT DOCUMENTS

| 3,259,422 | 7/1966 | Canon | 296/164 |
| 3,531,152 | 9/1970 | Tyler | 296/169 |
| 4,065,166 | 12/1977 | Shoemaker | 296/159 |

Primary Examiner—Robert R. Song
Attorney, Agent, or Firm—Richard L. Miller

[57] ABSTRACT

A van camper including door panels in the side and rear walls thereof that are outwardly, downwardly pivotable about a lower hinge so to form bed platforms for sleeping thereupon, a canvas canopy detachable snap fastened around each doorway extending over the horizontal bed platform, hydraulic shock absorbers for gently lowering the door and a winch with cable to raise the door into vertical closed position.

1 Claim, 6 Drawing Figures

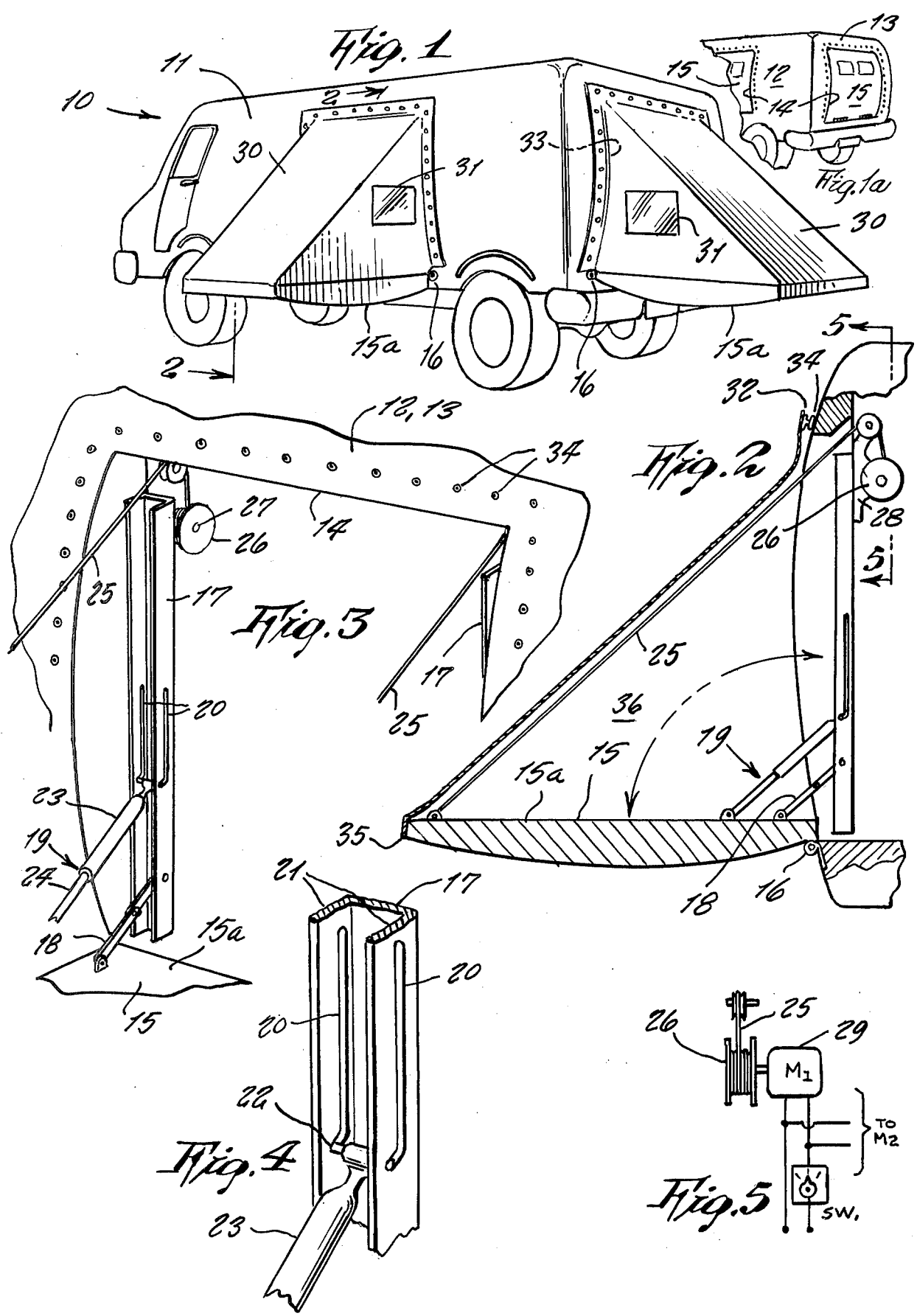

HORIZONTAL AUXILIARY SLEEPER DOOR

This invention relates generally to automotive camper vehicles, vans or recreational Vehicles.

It is well known to most owners of van campers that often there are not enough sleeping accommodations inside a camper, particularly when a larger number of persons get together for a long trip, so that they become crowded in sleeping conditions or are obliged to sleep outside if such is possible. This situation is objectionable and is therefore in want of an improvement.

Accordingly, it is a principal object of the present invention to provide a camper which includes outwardly extendable door panels in the walls thereof so to form bedding areas during the night, and thus accommodate more sleepers, and which during the day are retractable out-of-the-way in order to give a normal streamlined shape and appearance to the vehicle for travel.

Another object is to provide a camper which can be quickly converted between travel and sleeping conditions, and which does not require skill or strong effort to accomplish.

Further objects of the invention will appear as the descriptions proceed.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of a van camper with the invention installed thereupon, and in an operative position.

FIG. 1a is a similar view thereof with the invention in stored away position.

FIG. 2 is a cross sectional view on line 2—2 of FIG. 1.

FIG. 3 is a perspective view thereof.

FIG. 4 is an enlarged detail of structure shown in FIG. 3.

FIG. 5 is a view in direction 5—5 of FIG. 2.

Referring now to the drawing in greater detail, the reference numeral 10 represents a van camper automotive vehicle according to the present invention, and which includes a box-like body 11 having streamlined, opposite side walls 12 and a rear wall 13.

The walls 12 and 13 may be manufactured having doorway openings 14 therein and in each of which a door 15 is positioned so to pivot about hinges 16 along a lower edge thereof so that in a vertical position the outer side of the door is flush with the outer surface of the wall, and the door in an outwardly, downwardly pivoted position forms a horizontal bedding platform as shown at 15a, so to thus increase the sleeping area of the vehicle. Naturally doorway 14 can be on either side of vehicle even though not shown.

A vertical channel 17 is located at each side end of the doorway and forms an integral part of the vehicle body rigid framework.

A foldable lock arm 18 pivotally secured at one end to the channel and at the other end to the door limits the pivotal travel of the door between a vertical and horizontal positions. A hydraulic shock absorber 19 likewise secured between the channel and door permits the door to be lowered gently. A verticle slot 20 in each side rail 21 of the channel receives an end of a cross pin 22 secured to one end of the cylinder 23 of the shock absorber. Thus upon opening the door, the pin slides freely in the slots downwardly, and the shock absorber becomes effective only after the pin reaches the lower ends of the slot, and the piston 24 thereof then commences to slide in the cylinder so to retard only the final door opening action. Thus the door weight is gently handled by the shock absorber.

Both the lock arm and the shock absorber are stored away inside the channel when the door is in a closed position.

Each upper corner of the door is attached to cable 25 which is reeled up on a winch reel 26 supported on the rear side of the channel by means of a reel pin 27 in a bearing bracket 28 stationarily mounted. The reel pin may be made to be rotated either by a manually operated hand crank or else optionally by an electric motor, as shown in FIG. 5. In either case, a gear reduction mechanism would be desirable to be incorporated with the pin so that pivotal travel of the door can safely, slowly controlled with no heavy physical effort. Accordingly, even an older person or a woman can easily control the door movement with a hand crank. On optional electrically controlled systems, and safety stop button would be included for instant stopping at any point and easier operation in a more luxurious system.

The reels at each side of the doorway may be either independently controlled or else made connected so as to operate together.

In order to protect the bed area, thus provided, from weather, a canopy 30 would be fitted over the same. The canopy would be made of waterproof material such as foldable canvas or the like and may optionally include flexible, plastic, transparent windows or screens 31. The canopy would be shaped triangular so to rest on the angularly inclined cables, while snap fastener elements 32 around an opening 33 at one end of the canopy are snap-engaged in fastener elements 34 located around the doorway opening 14. It should be further noted whether or not cables are used, the snaps will form fit the triangular shape of the canopy tents. A bottom edge 35 of the canopy overlaps the door, as shown.

Communication through opening 33 is provided from the camper body interior to the sleeping area 36. The auxiliary sleeping area thus formed may be made for either one or more sleepers depending upon the width of the doors. Bedding or sleeping bags can be used.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. An automotive camper with auxiliary sleeping area, comprising in combination, a camper box-like body including opposite side walls and a rear wall, a doorway opening in said walls, a door in each said doorway opening, said door being pivotable about a hinge along its lower edge, and between a vertical and an outwardly horizontal positions, and a detachable canopy over said door in said horizontal position to form said auxiliary sleeping area, wherein a stationary, vertical channel at each side end of said doorway opening supports a hydraulic shock absorber and a lock arm to said door, and a winch mounted on said channel including a reel having a cable connected to an upper corner of said door, wherein said canopy is secured by snap fasteners around an edge of said doorway opening, said canopy being shaped to rest upon said cables connected to said door.

* * * * *